May 1, 1934.　　　　R. S. WEIMER　　　　1,956,738
MEANS AND METHOD OF EXCAVATING AND TRANSPORTING EARTHY MATERIALS
Filed July 6, 1931　　　7 Sheets-Sheet 6
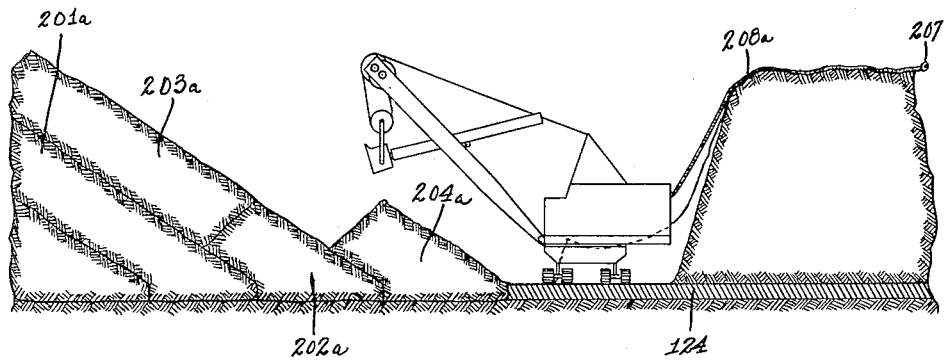
_Fig_12
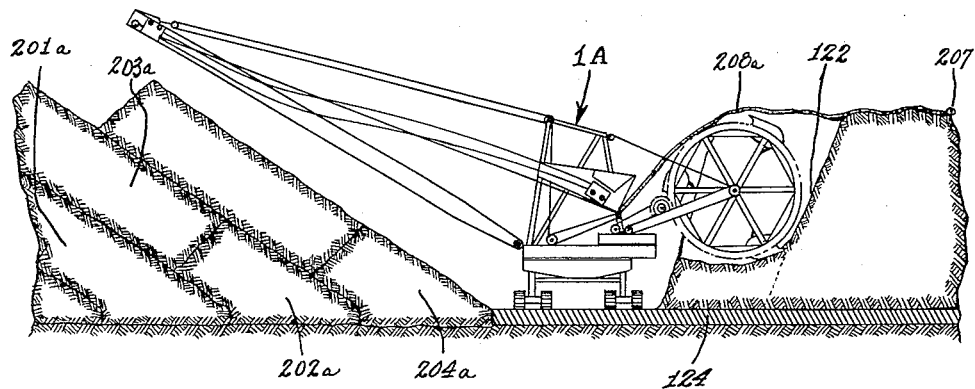
_Fig_13
Raymond S. Weimer
INVENTOR
BY Munn &Co.
ATTORNEYS

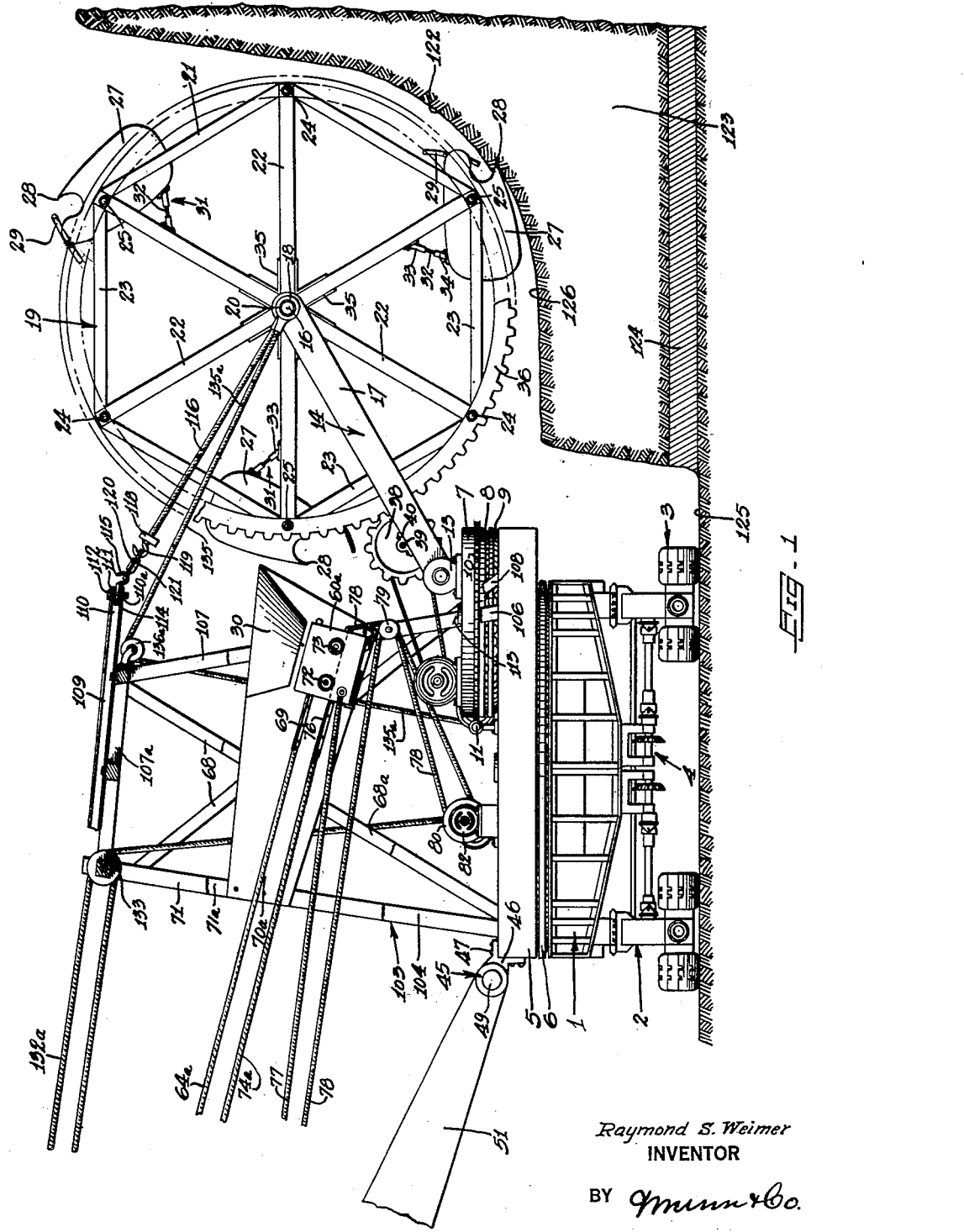

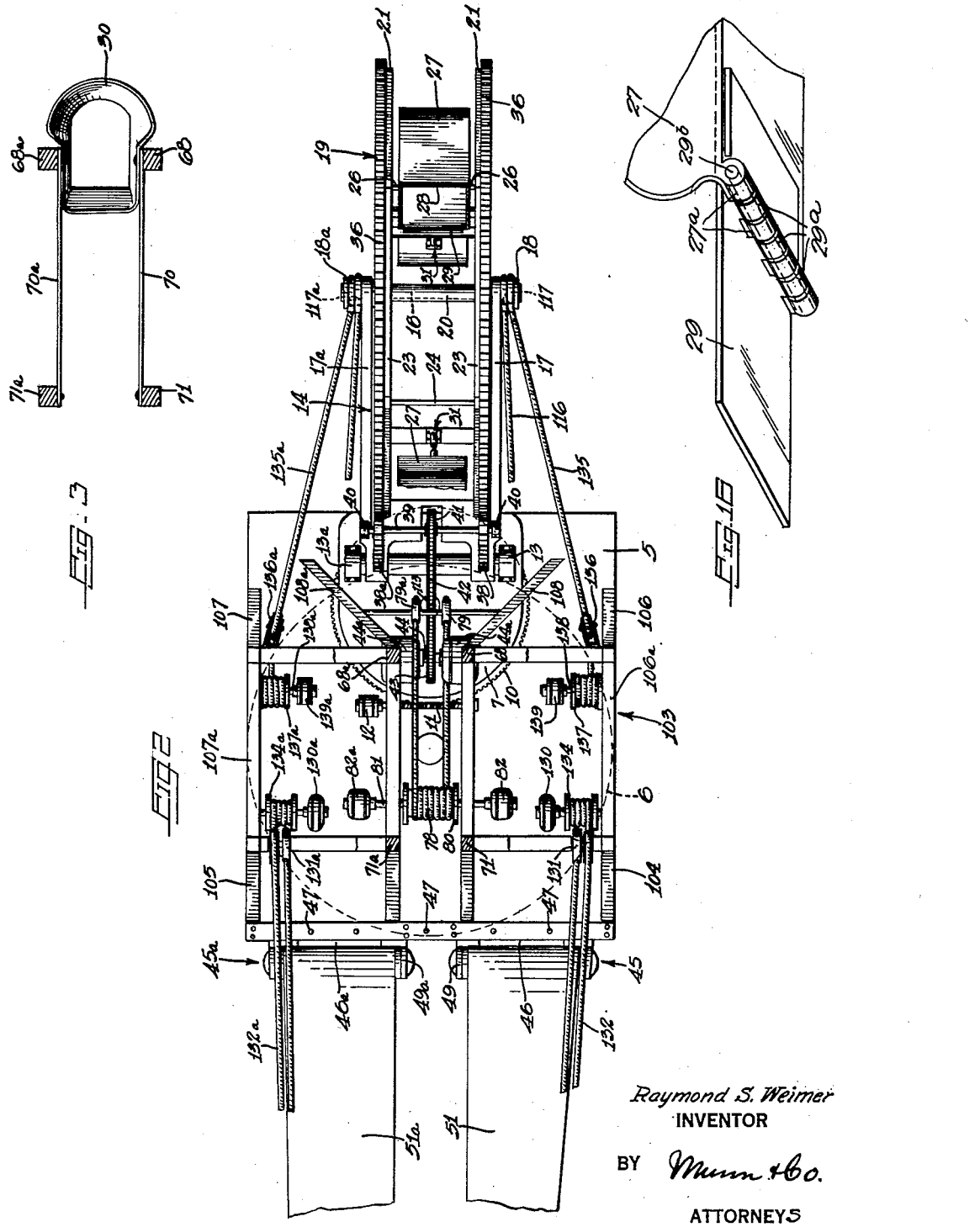

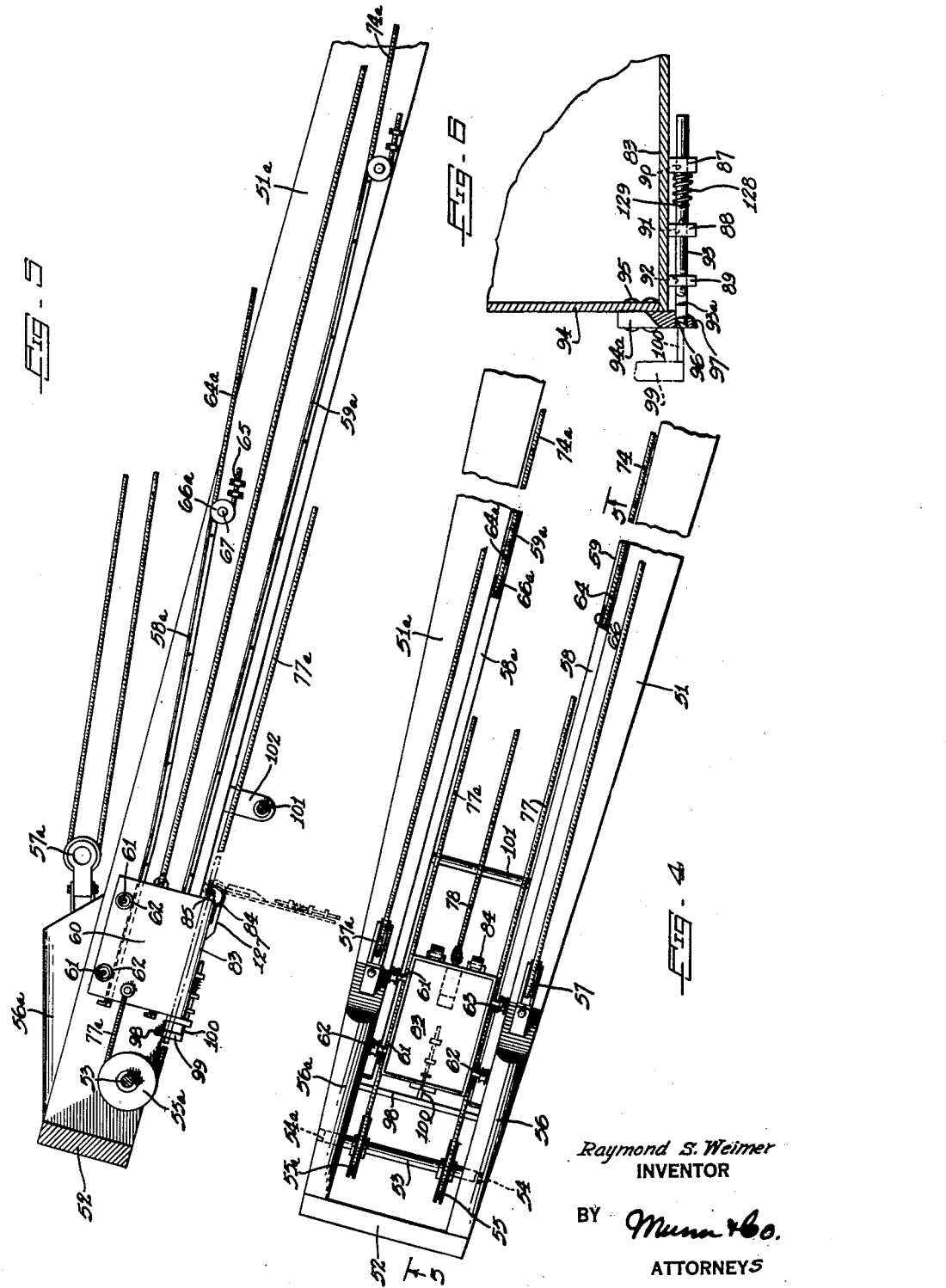

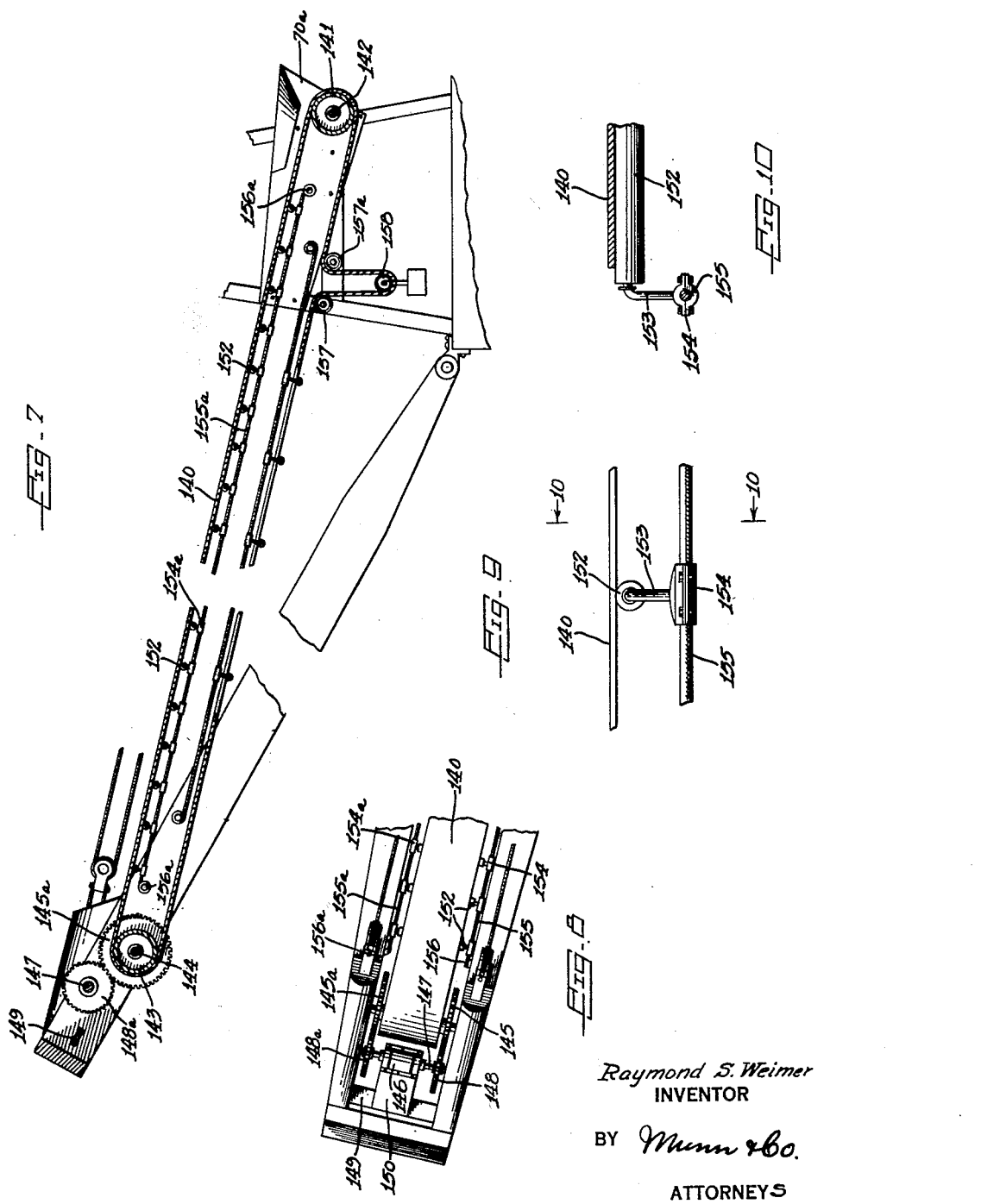

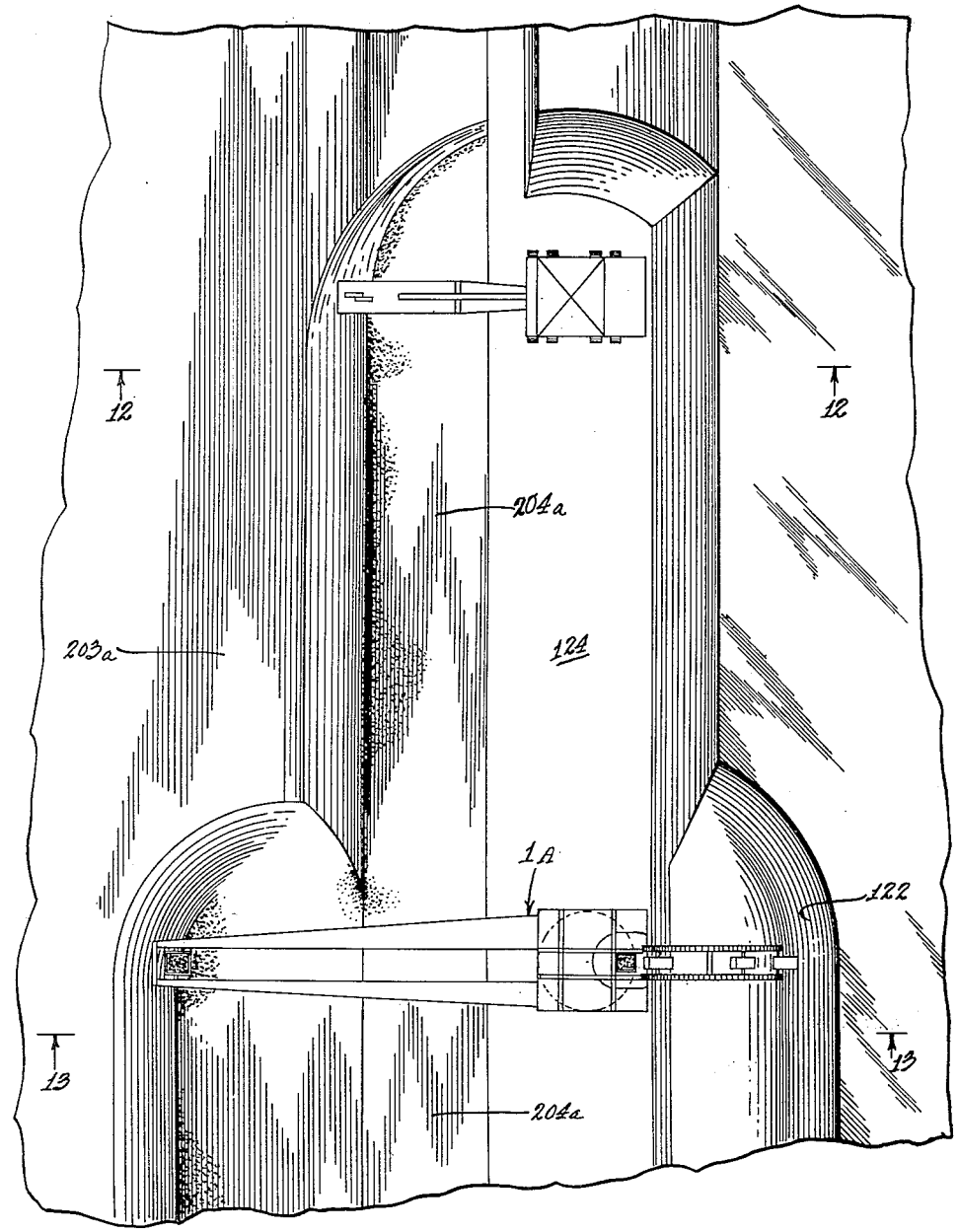
_FIG_11

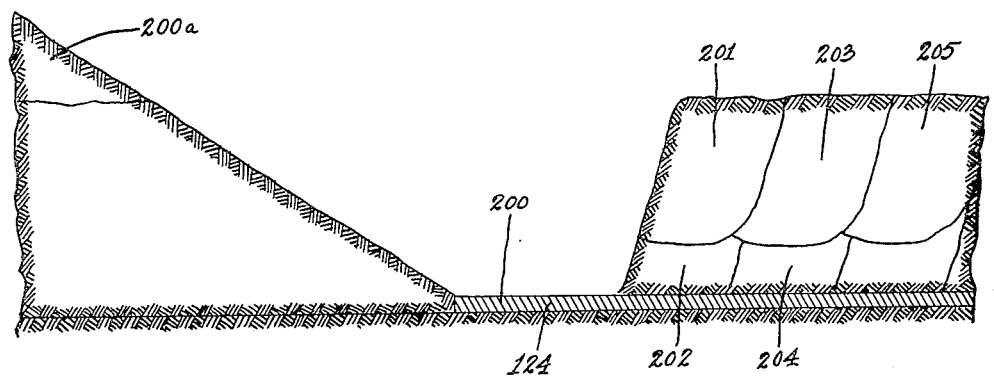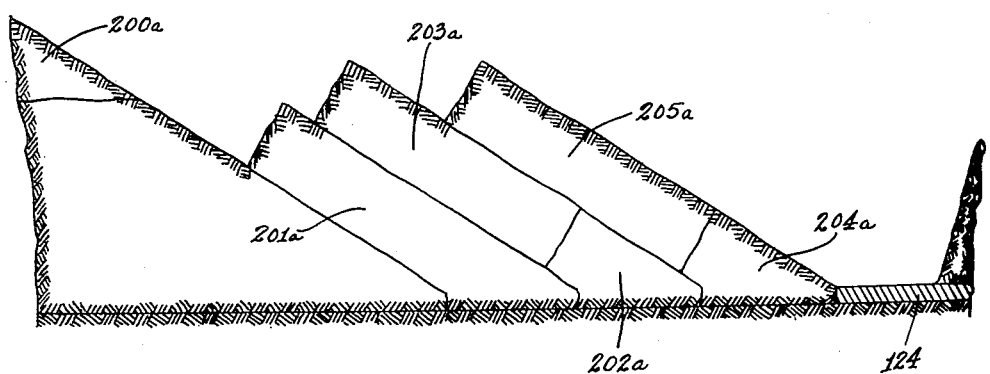

Patented May 1, 1934

1,956,738

UNITED STATES PATENT OFFICE 1,956,738

MEANS AND METHOD OF EXCAVATING AND TRANSPORTING EARTHY MATERIALS

Raymond Samuel Weimer, Wilmington, Ill.

Application July 6. 1931, Serial No. 549,002

7 Claims. (Cl. 37—190)

My invention relates to improvements in means and method of excavating and transporting earthy materials, and it consists in the steps hereinafter described, and in the combinations, constructions, and arrangements herein described and claimed.

An object of my invention is to provide a means and method of excavating and transporting earthy materials.

One of the prime and basic needs of man is the digging and transporting of earthy materials economically through short distances. Of late, there have been frantic efforts to increase the capacities and range of the type of excavators now in use. These excavators are characterized by the fact that the entire main deck or platform of the machine must be rotated in order to transport the load carried by the shovel or dipper of the machine. This effort to increase the limits of the excavators is due to the knowledge that there is an almost unlimited quantity of minerals within one hundred feet of the surface of the ground which may be economically won if the range necessary to remove the deep overburden of earth which covers the minerals is developed and the yardage capacity of the machines can be economically increased. Each economically obtained capacity renders many new mineral deposits available.

While in the past success has rewarded the effort to raise these ranges and capacities of the machine, it now appears that the limits of the present type of excavators have been substantially reached both from a financial aspect and a physical one. The limited increase of tonnage available is not sufficient to warrant the installation of excavators larger than of the above-mentioned type.

It can be easily proven that the cost of the machine increases much faster than the economic value of the increased range and capacity obtained by the production of a larger machine. Furthermore, the physical limit of this type of excavator has been substantially reached because of the fact that many of the stresses in the excavators vary as the square and even as the cube of certain stra'ght line dimensions. The tremendous stresses to which the machine is subjected when a carload of dirt in a shovel is suddenly swung in a large arc about the machine are such that the metals and the materials now available for the present type cf constructions could not stand these stresses. Were it not for these stresses, the range of the present type machines would be substantially increased. The engineering difficulties involved are greatly increased by the fact that the speed at which the machine is rotated could not be decreased but rather must be increased due to the tremendous overhead of a large machine costing, say, $300,000.00. The capacities of the before-mentioned types of machines are further limited by the fact that the shovel must serve both as an excavating device and as a transportation means. Under ordinary operating conditions, these machines are useless three-fourths of the time as excavators inasmuch as the bucket or shovel must be transported to the point where the earthy material is deposited and returned to the point of excavation before the excavating functions of the machine may be utilized.

It is extremely essential that the excavating means and the transportation means be united in a single machine which must be under the control of a single operator in order to prevent the loss of time necessarily incurred by the movement of two separate machines and the readjusting of the two machines after each forward movement of the excavator made in reaching out for unexcavated portions of the material.

In the mamoth sizes of machines now necessarily employed where soil stripping methods are economically utilized, it is pyhsically impossible to substantially increase the range of the boom and the speed of transportation of the material without setting up stresses beyond the limitations of the metals now available.

It is an object of my invention to provide a mechanism which does not possess the above-mentioned inherent limitations in the present type of excavators now employed in the mining industry in removing enormous quantities of earthy materials a considerable distance in a short period of time.

A further object is to provide an improved means and a method of strip mining.

A further object is to provide a means and a method of using the bench or terrace scheme in open pit mining.

A further object is to provide a means of excavating and transporting earthy materials a greater distance without moving the means for excavating and the means for transporting the material about the vertical axis of the machine.

A further object is to provide a means and a method of excavating material, moving it across the man-made ravine from which the material has been removed, and depositing it in an efficient manner at a point well above the level of the ground from which the material is being removed.

A further object is to provide a rotary excavator having means for transporting earthy material across the man-made pit or ravine from which the earth is being removed.

A further object is to provide a rotary excavator adapted to transport soil and the like to a considerable height above and distance beyond the point from which the material is being excavated.

A further object of my invention is to provide a rotary excavator in combination with a straight line conveying means adapted to remove the soil at the same time the excavator is digging the soil.

Other objects and advantages will appear in the following specification, and the novel features of the invention will be particularly pointed out in the appended claims.

My invention is illustrated in the accompanying drawings, forming part of this application, in which Figure 1 is a fragmentary side elevational view of my invention with certain portions partly broken away, Figure 2 is a plan view of my invention, partly in section, showing cable connecting means, Figure 3 is a detailed plan view of the hopper used in connection with my machine, Figure 4 is an enlarged plan view of an upper portion of the boom, Figure 5 is a section taken along the line 5—5 of Figure 4, Figure 6 is an enlarged detail view of the locking means associated with the material conveying car or bucket, Figure 7 is a vertical sectional view of a modified form which may be utilized in place of the dump car buckets and the cables and motors associated therewith, Figure 8 is a fragmentary top plan view of the conveyor shown in Figure 7, Figure 9 is an enlarged fragmentary detail view showing the manner in which the belt conveyor is supported between the drums, Figure 10 is a section taken along the line 10—10 of Figure 9, Figure 11 is a fragmentary top plan view of a mining pit showing my invention in operation, Figure 12 is a section taken along the line 12—12 of Figure 11, Figure 13 is a section taken along the line 13—13 of Figure 11, Figure 14 is a section taken transversely of the pit showing the overburden divided into upper and lower sections, and indicating portions of the overburden which are to be excavated, Figure 15 is a section taken transversely of the pit, showing the sections referred to in Figure 14 removed and stacked in accordance with my method of removing earthy material, and Figure 16 is a broken perspective view of a bucket and a soil deflecting plate.

In carrying out my invention, I make use of a lower frame portion 1 which may be supported by an adjustable supporting means 2 which is, in turn, supported by a caterpillar mechanism 3. The caterpillar mechanism may be driven in any suitable manner, such as, for instance, by a driving mechanism 4. Upon the top of the lower frame portion, I have provided a rotatably mounted turntable 5 supported by roller bearing means 6. The turntable 5 may be rotated by any suitable driving mechanism and motor, which are not shown. The above-mentioned elements of my invention form no novel part thereof and their construction and operation are well known in the art and require no detailed description.

At the rear portion of the turntable 5, I have provided a second turntable 7 which is supported by a base portion 8 and a roller bearing mechanism 9. The turntable 7 has a circumferentially disposed gear ring 10. I provide a worm drive mechanism 11 which may be connected to a motor 12 whereby the turntable 7 may be operated.

On the turntable 7 I have secured aligned bearing means 13 and 13a which are provided for the purpose of pivotally supporting a split boom means 14. The split boom means is provided with a fixed axle 16 which extends outwardly beyond the split boom end portions 17 and 17a for the purpose of providing a support for the engagement means 18 and 18a adapted to be connected to supporting means hereinafter described.

A rotary wheel 19 is mounted upon the axle 16 by means of a sleeve 20. The wheel 19 consists of the sleeve 20 and two circular and oppositely positioned wheel portions 21 and these wheel portions may be rigidly secured to opposite ends of the sleeve 20. Each of the end portions may be provided with spoke members 22 held together at their outer end by bracing members 23.

The wheel end portions 21 may be joined together at their perimeter by connecting rods 24 which are connected alternately to the spokes 22 substantially as shown in Figure 1. The outer ends of the spokes 22 positioned between the rods 24 may have bearings 25 for engaging the shaft portions 26 which are secured to the opposite sides of buckets 27. The buckets 27 may be of any suitable construction but are preferably of the type shown in Figure 1. Each of the buckets may be provided with teeth or cutters 28 which may be secured to the buckets by any suitable means.

Substantially opposite the teeth or cutters 28 of each bucket 27 I have provided a pivoted guiding means such as plate 29 directing the soil beyond the normal circumference of rotation of the wheel and into the hopper 30 when the respective buckets are in unloading position. The guiding plates 29 are pivotally attached to the buckets by means of ears 27a carried by the buckets, and ears 29a carried in the plates, as shown in Figure 16. The pivot pins 29b are nearer to the rear ends of the plates than to the forward ends, whereby the plates automatically adjust themselves while the buckets are in their excavating position in such manner as not to interfere with the filling of the buckets and are swung outwardly to operative position by gravity or by the contents of the buckets during the discharge thereof, as indicated in Figure 1.

The angle at which the teeth 28 of the bucket 27 cut into the earth may be determined by regulating an adjustable link means 31 which may consist of a right and left screw 32 and threaded end portions 33 and 34. The end portions 33 and 34 may be secured to the spokes 22 and the bucket 27, respectively, in any suitable manner. The spoke members 22 of the wheel 19 may be braced at their inner portions by V-shaped angle bars 35 which may, if desired, be made of a single piece of metal which may be rigidly connected to the sleeve 20 for the purpose of providing a more rugged construction. At the perimeter of the wheel portions 21, I have provided gear rings 36. These gear rings are so arranged as to engage with gear wheels 38 and 38a.

The gear wheels 38 and 38a are fixedly mounted upon a shaft 39, which, in turn, is mounted in bearing members 40. These bearing members may be secured to the split boom 14. Centrally disposed and rigidly attached to the shaft 39 is a gear wheel 41 which is arranged to be driven by a sprocket chain 42 connected to a sprocket wheel 43 mounted upon the shaft 44 of motors 44a. These motors are, in turn, secured to the top of the turntable 7. These motors are adapted to run at the same speed and apply an equal force to the shaft 44.

At the front end of the turntable 5, I have rigidly secured boom pivoting means 45 and 45a which may comprise U-shaped members 46 and 46a, respectively. These U-shaped members may be secured to the frame of the turntable 5 in any suitable manner, such as by bolts 47. The U-shaped members 46 and 46a are each adapted to receive bolt means 49 and 49a. Boom extension members 51 and 51a are pivotally mounted on these bolt means and may be made of a solid or latticework construction and braced together in any convenient manner. The extension members 51 and 51a may be connected at their outer ends by a connecting means 52. Just within the connecting means 52, I have provided a shaft 53 which may be mounted in aligned circular recessed portions 54 and 54a. The shaft 53 is provided with spaced-apart pulleys 55 and 55a. On the top of each boom, I have attached securing members 56 and 56a, to the inner ends of which I have secured pulley means 57 and 57a.

On the inner side walls of each of the boom members 51 and 51a, I have provided upper angle bars 58 and 58a and lower angle bars 59 and 59a for the purpose of providing rigid upper and lower end track portions for buckets or cars 60 and 60a, respectively. The car 60 may be provided with shaft studs 61, two of which are secured to the upper portion of each side of the car 60 substantially as shown in Figures 4 and 5 of the accompanying drawings.

On these shafts are mounted wheels 62 adapted for supporting the car on the tracks 58 and 58a. These wheels 62 may be provided with circumferentially disposed circular grooves 63 for the purpose of enabling the wheels 62 to engage cable means 64 and 64a. These cable means are secured near the ends of the tracks 58 and 58a by any suitable means, such as clamp means 65 and pulley means 66 and 66a. These pulley means 66 and 66a may be secured by shaft studs 67 which may, in turn, be rigidly secured to the boom extending portions 51 and 51a. One of the clamps 65 and one of the studs 67 are shown in Figure 5.

The opposite ends of the cables 64 and 64a may be secured to track means 69 which may, in turn, be secured to plates 70 and 70a and adapted for supporting the wheels of the car 60 at the inner end of its track. The plates 70 and 70a may be secured by any suitable means to frame members 68 and 68a and 71 and 71a, respectively.

The car 60a is provided with shaft studs 72 and wheels 73 of similar construction to the shaft studs 61 and the wheels 62 of the car 60. The lower track portion, consisting of the angle bars 59 and 59a, is provided with cables 74 and 74a. These cables are secured to the inside walls of the boom extension members 51 and 51a near the inner end of the angle bars 59 and 59a in the same manner as are the cables 64 and 64a. The opposite end of the cables 74 and 74a may be secured in the same manner as are the cables 64 and 64a. The cables 74 and 74a are provided with track means 76 in a similar manner as the cables 64 and 64a are provided with the track means 69. It will be noted that the shaft studs 72 and the wheels 73 are positioned near the mid-portions of the sides of the car 60a, whereas in the car 60, the corresponding studs and wheels are positioned at the upper edges of its side portions.

The purpose of this arrangement is to provide means whereby the cars 60 and 60a may run upon different tracks and yet occupy substantially the same positions at the end of the tracks. It will, of course, be understood that the track of the car 60a consists of the angle bars 59 and 59a, the cables 74 and 74a, and the lower angle bar means 76. The cars 60 and 60a are connected at their front portions to each other by means of the cables 77 and 77a which run over the pulley wheels 55 and 55a. The cables are of such length that when the car 60 is in the unloading position, the car 60a is in the loading position directly beneath the hopper 30. Each of the cars has its rear portions connected together by means of a cable 78 which rides upon the pulleys 79 and 79a and over the drum 80 in such a manner that the cable 78 pulls one car forward as the other car is being pulled backward.

The drum 80 is provided with a shaft 81 which extends on either side of the drum and may be driven by motors 82 and 82a. These motors may be synchronized. The buckets 60 and 60a may each be provided with a trapdoor 83 which is pivotally secured at the rear in any convenient manner, such as, for instance, by extending lug members 84 and bolt means 85. The front end of the trapdoor 83 is best seen in Figure 6, and is provided with downwardly extending lug portions 87, 88, and 89 having aligned openings 90, 91, and 92, respectively. These openings are adapted to receive a rod 93 which may be circular in cross section except at its front portion 93a. The front portion 93a may be rectangular in cross section and have its front edge beveled substantially as shown in Figure 6.

At the lower portion of the front side wall 94 of each of the buckets 60 and 60a, I have provided a lug member 94a, which may be secured to the wall portion 94 in any convenient manner, such as, for instance, by rivets 95.

The lower portion of the lug member 94a is provided with an opening 96 adapted to receive the front portion 93a of the rod 93. It will be observed that the lower rear portion of the lug member 94a has a rounded shoulder 97 adapted to force the rod 93 backward when the trapdoor 83 of the bucket is moving upwardly into its closed position.

To the rear and below the shaft 53, I have provided a cross beam 98 which may be suitably secured at opposite ends to the beam extension members 51 and 51a. The cross member 98 has a downwardly extending member 99 provided with an extension 100. This extension 100 is adapted to extend into the opening 96 of the lug 94a when a bucket is advanced into its unloading position. Slightly to the rear of the bucket 60, as shown in Figures 4 and 5, I have provided a cross member 101 secured at either end to downwardly extending lugs 102 which are, in turn, rigidly secured to the boom extension members 51 and 51a, respectively.

The turntable 5, which forms the main deck of my machine, is provided with a frame portion 103, which may consist of any construction adequate for the purpose intended. For the purposes of illustration, I have shown the front upwardly and inwardly inclined beams 104, 71, 71a, and 105. At the rear I have shown upwardly and inwardly inclined frame members 106 and 107, which, together with the diagonally inclined frame members 68 and 68a and the cross beams 107a and 106a, may form the supporting frame 103. I may also utilize two additional frame members 108 and 108a for the purpose of adding an additional rigidity to the frame structure. Metal plates 70 and 70a also add to the rigidity of the frame structure 103, as well as serve to support the hopper 30 and the inner track means upon which the cars 60 and 60a are supported when they are in the loading position beneath the hopper.

On the top of the frame structure 103, I have provided and rigidly secured an I-beam 109. The end portion 110 may have its vertical connecting section cut away and two opposite openings 110a and 111 may be made for receiving a bolt 112. The bolt 112 must be directly positioned above the central journal 113 of the turntable 7. Upon the bolt is a pivotally mounted collar member 114 provided with a hook portion 115. I have also provided a U-shaped member 116 having openings 117 and 117a adapted to be held by the engagement means 18 and 18a positioned at either end of the shaft 20. The crossbar 118 of the U-shaped member is provided with a hook means 119. A chain 120 having large circular links 121 may be connected with the hook portions 115 and 119. It will be observed that the rotary wheel 19 is pivotally supported by the U-shaped member 116, the chain 120, and the collar 114, in such a manner that the rotary wheel may turn upon its axis without becoming unbalanced in any respect.

The electrical parts connected to the motors by which the various parts of my invention are operated, such as the electrical conductors, the switchboards, and the control mechanism, are not shown, as they form no novel features of my invention and their construction and operation are well known in the art.

From the foregoing description of the various parts of my invention, its operation may be readily understood. The rotary wheel 19 is particularly adapted to cut away a shelf portion 122 forming part of the overburden 123 covering an underlying layer or vein of mineral 124. The man-made ravine 125 may be opened up either by a steam shovel or a drag shovel in a manner well known to the art. The machine forming the heretofore described part of my invention may be directed so that the buckets 27 may engage the edge 126 of the overburden and the machine may be slowly advanced as the buckets penetrate deeper into the overburden 123.

The rotary wheel may be at the same time rotated about or turned on its axis sufficiently to enable it to make a substantially semicircular cut into the overburden. After this same semicircular cut has been made as far as the cutting buckets can reach, the machine is then slowly advanced up or down the ravine 125 in order to enable the buckets to reach out and remove new portions of the overburden. In actual operation, the ravine 125 may be several miles in length.

As has before been mentioned, the angle at which the teeth engage the earthy material may be regulated by the adjustable length means 31. It will be observed that the guiding means 29 of the bucket 27 does not interfere with the filling of the bucket. The guiding means, however, is so pivoted that it opens outwardly when the bucket has passed the highest portion of its travel, and forms a guide and support for the earthy material in the bucket when it has reached such a position as to discharge into the hopper 30. At this position, the rotation of the wheel 19 is stopped long enough for the bucket to empty its contents into the hopper. It will also be observed that one of the buckets is positioned directly beneath the bottom of the hopper 30 in such a manner as to receive the excavated material from the hopper.

Let us assume that the car 60 is in its unloading position and that the car 60a is positioned beneath the hopper 30 and being filled. When the car 60 has been filled, the motor provided for driving the cable 78 is operated in such a manner as to move the car 60a to its unloading position and to remove the car 60 beneath the hopper 30. The cars 60 and 60a will, of course, pass each other near the mid-portions of their travel. The track portions of these cars are so disposed as to permit the car 60 to pass over the car 60a.

The car 60 and the car 60a are each provided with a striking member 127 secured respectively to the rear and underside of the trapdoors 83 and 83a. As the car in the unloading position is retracted towards the turntable 5, the striking member 127 is brought in contact with the cross member 101 and the further downward and inward motion of the car causes the trapdoor 83 to swing upwardly until rod 93 comes in contact with the rounded shoulder portion 97 of the lug 94 in such a manner that the beveled edge of the rod is forced inwardly until the trapdoor 83 is closed. At this position, the rod 93 is held under a tension by means of a spring 128 having its rear end resting against the lug 87 and its front end resting against a cross pin 129. This tension forces the rod 93 into the opening 96 substantially as shown in Figure 6. As the loaded bucket moves into its unloading position, the extending member 100 of the lug 99 forces the rod 93 out of the opening 96 and the trapdoor 83 falls open and discharges the load in the car.

It will be observed I have provided motors 130 and 130a and drums 134 and 134a for elevating the boom extension members 51 and 51a by means of boom-supporting cables 132 and 132a. One end of each of these cables may be secured to the frame structure in any suitable manner, as is indicated at 133. The opposite ends of these cables may be secured to the drums 134 and 134a in such a manner that when the drums are rotated in one direction, the boom-supporting cables 132 and 132a lower the boom extension members 51 and 51a. When the drums are rotating in the opposite manner, the before-mentioned boom extension members will, of course, be elevated. The cables 132 and 132a move over pulleys 131 and 131a, which are suitably secured to the frame 103, and pulleys 57 and 57a, which are secured to the securing means 56 and 56a located on the top portion of the outer end of the boom extension members 51 and 51a.

It will be observed that by turning the turntable 5, the cars 60 and 60a may be emptied at different positions relative to the ground so that when a pile has been stacked up to the desired height, the cars may empty into a lower portion of the stack.

The rotary wheel 19 may be raised or lowered by cables 135 and 135a. These cables are connected to the engagement means 18 and 18a at one end and, after passing over pulleys 136 and 136a which may be suitably secured to the frame 103, are wound around and secured to drums 137 and 137a. These last-mentioned drums are connected by means of shafts 138 and 138a to motors 139 and 139a. The drums and the motors may each be secured to the top of the turntable 5. The motors 139 and 139a are adapted to be operated at the same speed. They serve to raise or lower the rotary wheel 19 in substantially the same manner as the motors 130 and 130a serve to raise or lower the boom extension members 51 and 51a.

In Figures 7 to 10, inclusive, I show a modified form of my invention which utilizes a belt conveyor in place of the bucket car mechanism heretofore described. The belt 140 rotates upon a drum 141 which may be pivotally mounted on a shaft 142, and about a drum 143. The shaft 142 may be rotatably secured to the plates 70 and 70a and the drum 143 mounted on the shaft 144. Secured to either ends of the drum 143 are gear wheels 145 and 145a. The gear wheels 145 and 145a are driven by a motor 146 having a shaft 147 extending on either side of the motor and provided with gears 148 and 148a through which the power is transmitted to the belt. The frame of the motor may be secured to a cross member 149 having an extension member 150. The cross member 149 may be secured in any suitable manner to the boom extension members 51 and 51a. Between the drums 141 and 143, the belt 140 is supported on its upper side by rollers 152 mounted on axle members 153. These axle members may be bent at either end and provided with clamping means 154 and 154a. These clamping means may be attached to cables 155 and 155a.

The cables 155 and 155a may be attached at either end to rods 156 and 156a which are secured to the boom members 51 and 51a and to the plates 70 and 70a, respectively. The proper tension may be maintained on the belt 140 by means of the pulleys 157 and 157a and the weighted pulley 158.

I make use of the device of my invention in combination with other machines in carrying out my method of removing the overburden under which a layer or vein of ore is hidden. Referring now to Figures 14 and 15, a longitudinal strip of the overburden may be removed by a steam or electric shovel, a drag line, or by any other suitable means, and deposited at one side of the cut at 200a. The device of my invention, as indicated by the numeral 1—A in Figure 12, may thereafter remove an upper portion of earth 201 and deposit it adjacent the pile of earth 200a, as is indicated at 201a. The lower shelf portion 202 may then be removed by a shovel and deposited against the lower portion of the pile 201a, as indicated at 202a. The portion of earth 203 may then be removed by my excavator to form the pile 203a, which is supported by the pile 201a and the pile 202a, as indicated in Figure 15. The section of earth 204 may then be removed by the steam shovel and stacked to form the pile 204a. The section of earth 205 may be deposited by my device as is indicated at 205a. The remainder of the overburden may be removed in the same manner. The vein of mineral 124 may be removed in any suitable manner as soon as the overburden of earth covering it is removed or at any time thereafter before it is covered by the loose earthy material.

This method enables the top portions of the overburden such as 203 and 205 to be deposited on the top of the lower portions indicated by the numerals 202a and 204a. An advantage of this method is that the lower portion of the overburden is stacked on the bottom of the ravine 200. Another advantage is that by the use of my excavator the upper stacks 203a and 205a may be made high enough so that they may be deposited above the lower portions 202a and 204a, and so forth. All of this may be done without appreciably rotating the position of the boom portions 51 and 51a of my excavator.

In carrying out this method, the shovel may always physically precede my excavator and follow it in the sequence of operations except when the first cut of earth is being made. The pit or ravine 200 may be several miles in length. Both the shovel and my excavator may be operated by electricity carried by a main cable 207 and cable leads 208a, not shown, which may be connected to the shovel and the excavator in any convenient manner.

It will be readily understood from the foregoing description of my excavator that the boom extension members may, if desired, be positioned so as to deposit the earthy material directly across the ravine 200. By being so positioned, the earthy material is carried the shortest possible distance. It will be observed that a shovel or any other excavating machine in which it is necessary to rotate the boom portion must transport the soil in a semicircular path having as its center the center main of the machine. I have discovered that by utilizing the methods herein disclosed with my machine that the soil may be removed and carried more rapidly and cheaply than is possible in the types of machines at present used in this work.

Inasmuch as the enormous overhead necessary to mining on a large scale is substantially the same, whether the old method or new method is used, it will be seen that there is a considerable saving effected.

In carrying out the operation of my invention, I also utilize a method of "crowding". The "crowding" or forcing of the teeth of the buckets 27 into the unexcavated soil may be accomplished in the following manner: The buckets may be directed so as to attack a section of the shelf which is not opposite the center of the turntable 7. The turntable 7 will then be in such a position that its center is to the right or left of a straight line drawn between the center of the turntable 5 and the point of attack of the shovels. Lines drawn between the point of attack and the center of the turntable 5 to the center of the turntable 7 will form, with the before-mentioned line drawn from the center of the turntable 5 to the point of attack, an elongated triangle. The turntable 5 may then be rotated so as to place all of the lines in substantially the same vertical plane. As this slight rotary movement of the turntable 5 is being carried out, the teeth 28 of the buckets 27 will of course be inserted more deeply into the earthy material forming the shelf 122 and the bucket will be enabled to cut out a bucket load of material as the rotary wheel 19 moves upward against the shelf 122. This rotary movement need ordinarily be but a slight one in order to fill the buckets as the caterpillar mechanism 3 may be easily moved down or up the man-made ravine for the purpose of exposing new sections of earth which will lie within easy reach of the excavating buckets.

I claim:

1. A rotary excavator of the character described having a turntable mounted on a turntable, said first-mentioned turntable being provided with a rotary wheel mechanism, said second-mentioned turntable being provided with boom extension members, a material transporting mechanism, and a hopper means, said rotary wheel mechanism being adapted to excavate soil from a shelf portion and convey the soil to said hopper means, said hopper means being adapted to deposit said soil on said material transporting mechanism, said material transporting mechanism being adapted to convey said excavated soil and drop it near the end of said boom extension members.

2. A rotary excavator of the character described having a turntable mounted on a turntable, said first-mentioned turntable being provided with a rotary wheel mechanism, said second-mentioned turntable being provided with boom extension members, a material transporting mechanism, and a hopper means, said rotary wheel mechanism being adapted to excavate soil from a shelf portion and convey the soil to said hopper means, said hopper means being adapted to deposit said soil on said material transporting mechanism, said material transporting mechanism being adapted to convey said excavated soil and drop it near the end of said boom extension members on a spoil pile positioned above said rotary wheel mechanism.

3. A rotary excavator of the character described having a turntable mounted on a turntable, said first-mentioned turntable being provided with a rotary wheel mechanism, said second-mentioned turntable being provided with boom extension members, a material transporting mechanism, and a hopper means, said rotary wheel mechanism being adapted to excavate soil from a shelf portion and convey the soil to said hopper means, said hopper means being adapted to deposit said soil on said material transporting mechanism, said material transporting mechanism being adapted to convey said excavated soil and drop it near the end of said boom extension members, said material transporting mechanism comprising a plurality of cars, said cars being provided with track and cable means, said tracks extending from beneath said hopper to an outer section of said boom extension members.

4. A rotary excavator of the character described having a turntable mounted on a turntable, said first-mentioned turntable being provided with a rotary wheel mechanism, said second-mentioned turntable being provided with boom extension members, a material transporting mechanism, and a hopper means, said rotary wheel mechanism being adapted to excavate soil from a shelf portion and convey the soil to said hopper means, said hopper means being adapted to deposit said soil on said material transporting mechanism, said material transporting mechanism being adapted to convey said excavated soil and drop it near the end of said boom extension members, said material transporting mechanism comprising a plurality of cars, said cars being provided with track and cable means, said tracks extending from beneath said hopper to an outer section of said boom extension members, said cars being provided with a swinging trapdoor, said car and said boom extension members having engagement means whereby said trapdoor may be opened at the upper end of its travel and closed when said car is being moved toward said hopper.

5. A rotary excavator of the character described having a turntable mounted on a turntable, said first-mentioned turntable being provided with a rotary wheel mechanism, said second-mentioned turntable being provided with boom extension members, a material transporting mechanism, and a hopper means, said rotary wheel mechanism being adapted to excavate soil from a shelf portion and convey the soil to said hopper means, said hopper means being adapted to deposit said soil on said material transporting mechanism, said material transporting mechanism being adapted to convey said excavated soil and drop it near the end of said boom extension members, said material transporting mechanism comprising an endless conveyor and means for driving the same, said conveyor extending from a point beneath said hopper to a point near the outer end of said boom extension members.

6. Mechanism of the class described comprising a turntable, an endless material conveyor carried thereby, a second turntable on said first turntable and a rotary excavating member carried by said second turntable and adapted to deposit material on said conveyor.

7. Excavating mechanism comprising a supporting structure provided with a laterally extending conveyor, a relatively stationary hopper on said structure for delivering material to said conveyor, a turntable on said structure, a boom pivotally mounted at one end on said turntable and adapted to be swung arcuately thereby independently of said hopper, a rotary excavating wheel carried by the free end of said boom, said wheel being provided with a plurality of excavating buckets, means on said structure for moving said boom and wheel to and from excavating position, and means rotatable with said wheel and cooperating with each of said buckets for discharging material carried by said buckets substantially radially beyond the normal circumference of rotation of the same and into said hopper.

RAYMOND SAMUEL WEIMER.